United States Patent
Rea et al.

(10) Patent No.: US 6,300,867 B1
(45) Date of Patent: Oct. 9, 2001

(54) TIRE LOW PRESSURE AUDIO WARNING DEVICE

(76) Inventors: Ryan M. Rea; James Lee Rea, both of 2019 Honey Suckle La., Jefferson City, MO (US) 65109; Stephen W. Blakely, 503 Beacon St., Apt. A, Alton, IL (US) 62002

( * ) Notice: Subject to any disclaimer, the term of this patent is extended or adjusted under 35 U.S.C. 154(b) by 0 days.

(21) Appl. No.: 09/584,971

(22) Filed: Jun. 1, 2000

(51) Int. Cl.[7] ............................................. B60C 20/00
(52) U.S. Cl. ........................................ 340/442; 340/445
(58) Field of Search ..................................... 340/442, 446, 340/445, 58, 447

(56) References Cited

U.S. PATENT DOCUMENTS

| | | | |
|---|---|---|---|
| 4,059,823 | * 11/1977 | Martin et al. | 340/58 |
| 4,067,235 | 1/1978 | Markland | 73/146.5 |
| 4,210,898 | 7/1980 | Betts | 340/58 |
| 4,237,738 | 12/1980 | Betts et al. | 73/146.5 |
| 4,240,061 | * 12/1980 | Cohen | 340/58 |
| 4,311,985 | 1/1982 | Gee et al. | 340/58 |
| 4,316,176 | 2/1982 | Gee et al. | 340/58 |
| 4,353,322 | 10/1982 | Weglin et al. | 116/34 |
| 4,450,431 | 5/1984 | Hochstein | 340/58 |
| 4,520,344 | * 5/1985 | Shu et al. | 340/58 |
| 4,723,445 | * 2/1988 | Ripley et al. | 73/146.3 |
| 4,734,674 | * 3/1988 | Thomas et al. | 340/58 |
| 4,814,745 | 3/1989 | Wang . | |
| 5,109,213 | 4/1992 | Williams | 340/447 |
| 5,285,189 | 2/1994 | Nowicki et al. | 340/447 |
| 5,289,161 | * 2/1994 | Huang | 340/447 |
| 5,559,484 | 9/1996 | Nowicki et al. | 340/447 |
| 5,889,464 | * 3/1999 | Huang | 340/442 |
| 5,945,908 | 8/1999 | Nowicki et al. | 340/447 |
| 6,031,450 | * 2/2000 | Huang | 340/442 |

* cited by examiner

*Primary Examiner*—Jeffery Hofsass
*Assistant Examiner*—Son Tang
(74) *Attorney, Agent, or Firm*—Richard J. Grundstrom

(57) ABSTRACT

A tire low pressure audio warning device for monitoring a tire for low air pressure and sounding an alarm when a low tire pressure condition exists. The tire low pressure audio warning device has a body that attaches to a valve stem of an inner tube or tubeless tire, or to an opening through a rim of the tire. Contained within the body is at least a low air pressure switch, a battery and an audio alarm. The low pressure switch is in air communications with the pressurized air within the tire or the inner tube. The audio alarm is electrically connected to and activated by the low air pressure switch when a low tire pressure exits. A centrifugal switch is provided within the body to prevent the audio alarm from sounding during tire rotation. The centrifugal switch opens when the tire is rotating, and closes when tire rotation is stopped. The battery within the body provides electrical power for the alarm. The alarm is easily heard by a driver, or any one else, when walking past the tire, when the vehicle is stopped or parked. The low pressure setting can be factory set or it can be of an adjustable type. The monitoring device can be used on all tires inflated with air or other gasses.

17 Claims, 15 Drawing Sheets

TIRE LOW PRESSURE AUDIO WARNING DEVICE

BACKGROUND OF THE INVENTION

The present invention relates to a low pressure audio warning device for tires and more particularly to an audio warning device that is activated when tire pressure drops below a preset value.

Tires on cars, trucks, trailers, motorcycles, motor coaches, all terrain vehicles, and most other types of vehicles all use tires filled or inflated with pressurized air. The air is held within the tires under pressure by the tire itself, such as with tubeless tires, or within inner tubes within the tires. The pressure varies depending on the tire, the size of the tire, the vehicle, the weight capacity, terrain, and other factors depending on its use. Many factors can and do affect the optimum pressure for tires.

Probably the most common use for tires is on cars and trucks on the highways throughout the United States and throughout the world. But, this invention can be used with any tire having pressurized air within the tire. One of the biggest problems with tires is the maintenance of the correct tire air pressure. High air pressure causes tire wear on the center of the tires. While low tire pressure attributes to wear on the outer edges of the tires. Both conditions, high and low pressure, can be dangerous. It leads too unusual tire wear, can cause control problems for the vehicle, and can limit the effective traction on the road surface. In addition, low and high pressure can lead to premature failure to the tire itself. Low tire pressure is typically the most prevalent problem. This invention addresses this problem by monitoring tire pressure and sounding an audio alarm when tire pressure reaches a predetermined low air pressure.

One type of tire is constructed from used tires. The outer thread surface of the used tires are ground to a uniform size and are treated with a thick covering having new treads. These types of tires are called recaps or retreads, in that the old tires are recovered or capped with the new treads. These are particularly popular within the trucking industry where there is a high quantity of tires used and the tires are relatively expensive. Generally, the recaps are somewhat cheaper than new tires and if cared for properly can last almost as long.

One major problem with recaps is that the treads or caps installed on the old tire core can be thrown off. The thrown tire treads, or gators as they are called, are left on the highway where they can cause major highway hazards, along with other blown tire parts. One reason why recaps are thrown off is attributed to inadequate tire pressure. Both high pressure and, more commonly and particularly, low pressure results in overheating, uneven wear, and uneven heating patterns. Overheating and uneven heating results in the recaps or treads separating from the tire core. Once separation begins, the centrifugal forces cause the treads to be thrown off the tire core. One way to help eliminate this problem is to monitor tire pressure on a frequent basis. Since tires are generally filled to the correct pressure, an over pressure is not much of a concern. Because there is pressurized air in tires, there is a tendency for air to leak out. This could be due to small cracks in the tires, rim seal leaks, weathering, defective tire valves and stems, punctures and dozens of other causes. Most drivers do not pay much attention, until it is very obvious that the tire pressure is low. This invention addresses this problem. This invention provides an audio alarm any time the tire pressure is below a preset level. It allows a driver or operator to easily tell when the tire pressure is low. The driver or operator does not have to take any affirmative actions to detect low pressure. The audio warning is easily detected when walking by the tires or side of the vehicle.

Additionally, low tire pressure in tires contributes to fuel costs. It is generally accepted that as tire pressure decreases, fuel usage increases. The lower tire pressure increases the rolling resistance between the tire and the road. Under inflation is one of the most significant factors in rolling resistance and loss of fuel economy. Maintaining tire pressure is the most important tire maintenance function. Cost per mile benefits will directly result from good tire pressure control. This invention provides an easy method of monitoring tire pressure with no affirmative action by the driver and results in good tire pressure control. Thus, there is a savings in both fuel cost by decreasing rolling resistance and in saving tire wear by the use of this invention.

Accordingly, it is an object of the present invention to provide a tire low pressure audio warning device adapted to continuously monitor tire pressure. With the tire low pressure audio warning device of this invention it has been found that tire pressure can be monitored for low pressure on a continuous basis with no affirmative action on part of the driver or other individual. It is a substitute for frequently checking air with a tire gauge as recommended.

Another object of the present invention is to provide a tire low pressure audio warning device constructed to provide an audio alarm whenever there is a low pressure condition. This feature makes it easy for a driver or other individual to detect low tire pressure and easily identify the tire.

A further object of the present invention is to provide a tire low pressure audio warning device that can be adapted for virtually any tire to thereby substantially reduce the need for continuously monitoring tire pressure on most all tire. Typically, a tire low audio pressure warning device can be made to cover any and most tire pressure or range of tire pressures.

Still another object of the present invention is to provide a tire low pressure audio warning device that may help prevent treads from recapped tires from being throwing off due to low pressure. Studies have indicated that one of the major causes for treads being thrown off truck tires is due to low pressure. This invention has the ability to reduce the incidents of treads being thrown off. The tire low pressure audio warning device of this invention continuously monitors tire pressure and provides an audio alarm easily detected by the drive when walking by the side of the vehicle.

Still a further object of the present invention is to provide a tire low pressure audio warning device that saves time for the driver and other individuals. The tire low pressure audio warning device of this invention is characterized by its ability to continuously monitor the tire pressure without any affirmative action by the driver or other individual. This saves time since the driver or others do not need to take the time to check each tire pressure.

Another object of the present invention is to provide a tire low pressure audio warning device that can possibly save lives. The basic tire low pressure audio warning device of this invention will make the highways safer by helping to eliminate thrown tire treads from recapped tires and to possibly reduce or eliminate accidents caused by under inflated tires.

Yet one more object of the tire low pressure warning device is to save money. Since low tire pressure can be easily monitored with no affirmative action time is saved. Once the alarm is sounded, the tires are easily filled to the correct air pressure. Since tires will be better maintained, the life of the tire can possibly be extended, to thereby save the expense of having to replace tires at a more frequent interval. Additionally, since low pressure is monitored there is less likelihood for traveling with low tires. This reduces the rolling resistance and provides for a greater fuel saving.

To accomplish the foregoing and other objects of this invention there is provided a tire low pressure audio warning device and more particularly to a device that continuously monitors tire pressure and sounds an audio alarm when a low tire pressure condition exists.

SUMMARY OF THE INVENTION

The tire low pressure audio warning device of this invention includes a pressure monitoring device for tires having a body that attaches to either the rim in place of the valve stem, in another opening provided in the rim, or it can be screwed onto an existing valve stem. Within the body there is a low pressure switch which closes an electrical contact when a low pressure condition exists within the tire. An audio alarm sounds an audio warning when the tire has a low pressure condition as detected by the low pressure switch. The pressure switch can be factory set to a predetermined low pressure setting or it can be of an adjustable type. A battery provides electrical power for the audio alarm. An electrical circuit electrically connects the components. The monitoring device can be used on all tires inflated with air or other gasses.

Additionally, the tire low pressure audio warning device can include a centrifugal or motion switch to turn the device off when the tire is in motion, to save on battery life. The centrifugal switch turns the unit off when the tire is rotating. A battery test circuit is provided for periodically testing the battery. The battery can be sealed in a replaceable unit, or there can be a battery cap so the battery can be replaced as needed.

The above mentioned and other objects, and features of the present invention will be better understood and appreciated from the following detailed description of the main embodiment thereof, selected for purposes of illustration and shown in the accompanying drawings.

DETAILED DESCRIPTION

Figure 1A:
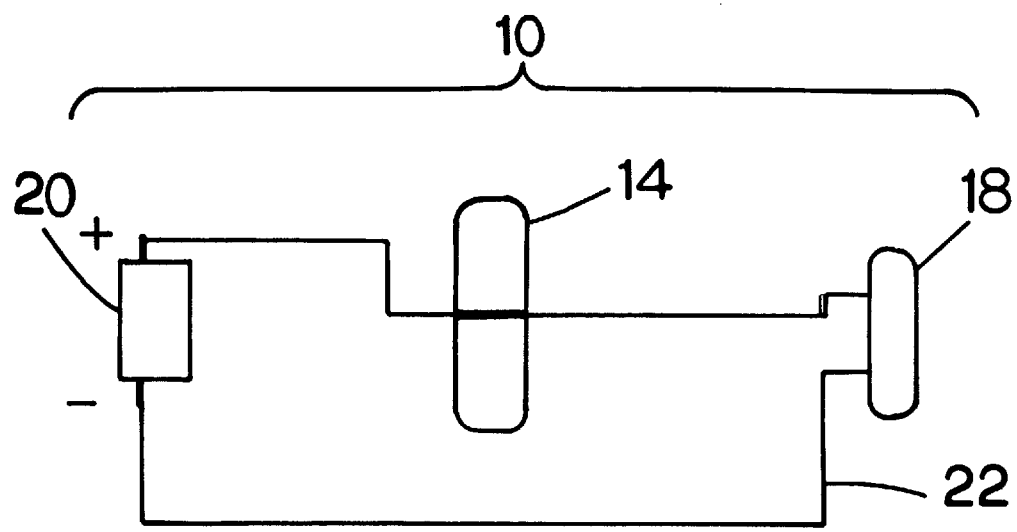
FIG. 1A show a schematical representation of the basic components of tire low pressure audio warning device of this invention, with the pressure switch being closed.

Referring now to the drawings in general there is shown several preferred embodiments and best mode contemplated for the tire low pressure audio warning device 10 of this invention.

The preferred embodiments and the best mode contemplated of the tire low pressure audio warning device 10 of the present invention are herein described. However, it should be understood that the best modes for carrying out the invention hereinafter described is offered by way of illustration and not by the way of limitation. It is intended that the scope of the invention includes all modifications which incorporate the principal design features.

The tire low pressure audio warning device 10 of this invention has several different applications and embodiments. First, a basic description containing the basic required components will be described. Other applications and embodiments will be expanded upon from this basic description.

In a most simple explanation, the tire low pressure audio warning device 10 has a body 12 that is attachable to a tire 8, inner tube, or rim 6 of a tire. The body 12 contains or houses all the components. The basic embodiment has as a minimum of three components. This includes a low pressure switch 14, an audio alarm 18, and a battery 20. In the most basic embodiment, the body 12 is designed to be screwed onto an existing valve stem in place of a valve stem cap. Obviously, there would be some sort of seal between the valve stem 4 and the body 12. The simplest means is to provide an o-ring or by coating the threads with a sealing material. This embodiment is envisioned to be the most likely commercial design, because of the simplicity and universal use with existing tires.

Figure 1B:
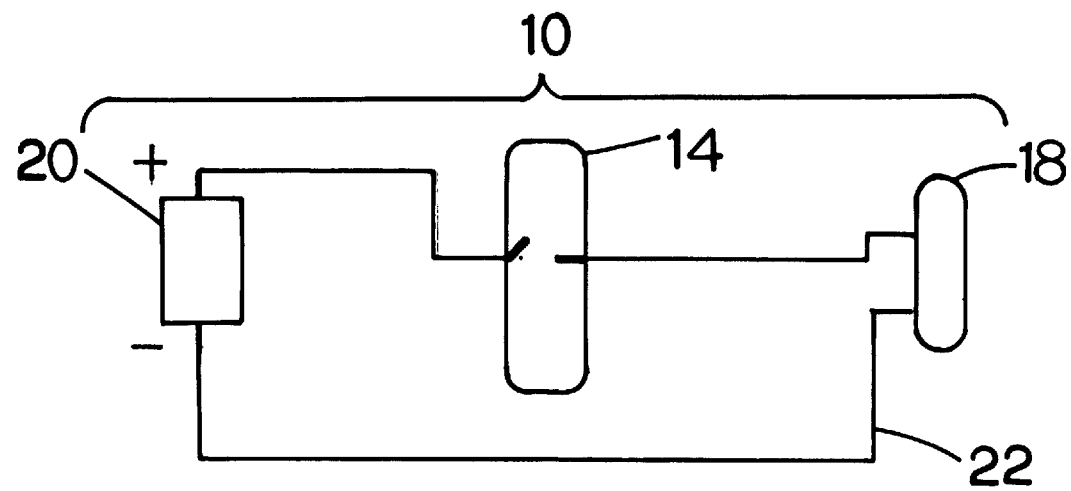
FIG. 1B is a schematical representation similar to FIG. 1, with the pressure switch open.

The low pressure switch 14 has air communications with the pressurized air within the tire 8, as illustrated in the figures. When a predetermined low pressure condition exists within the tire 8, the low pressure switch 14 closes or makes an electrical contact. The audio alarm 18, as the name implies, provides an audio warning when the low pressure switch 14 has closed. The audio alarm can be heard by someone near or passing by the tire. An electrical circuit 22 electrically connects the air pressure switch 14, audio alarm 18, and battery 20, as required. This basic embodiment is schematically shown in FIGS. 1A and 1B, where 1A shows the pressure switch closed so the audio alarm can be sounded, typical of a low pressure condition. 1B shows the pressure switch 14 open so the alarm is not sounded, typical of normal air pressure within a tire 8.

Figure 2A:
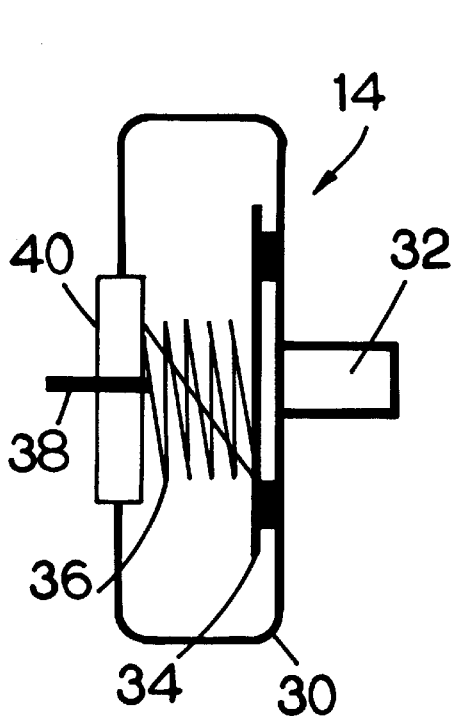
FIG. 2A shows an enlarged representation of one type of pressure switch in a closed position.
Figure 2B:
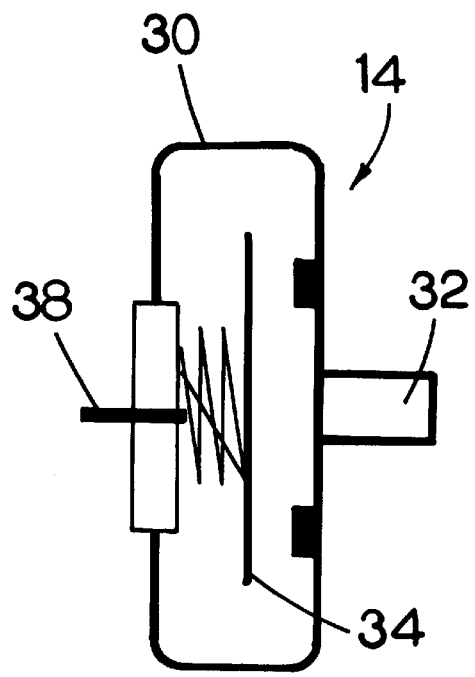
FIG. 2B shows the pressure switch of FIG. 2A, but in an open position.

The low pressure switch 14, in the preferred embodiments, is a diaphragm type switch, representatively shown closed in FIG. 2A and open in FIG. 2B. Typically, these types of switches are encapsulated in a shell 30. The shell 30 is typically electrically conductive so it is used as an electrical contact. There is an air passage 32 to the internal opening of the shell 30. The air passage 32 will be in air communication with the pressurized air within the tire 8. Incoming air, through passage 32, acts on a diaphragm 34. Low air pressure causes the diaphragm to close while high pressure or normal pressure will keep the diaphragm open. The amount of air pressure that opens the diaphragm 34, or allows it to close, is determined by the tension of a spring 36. As tension increases, the higher the pressure needed to open the diaphragm, and the higher the low pressure setting. The amount of tension is obviously a function of the spring 36. As such, to make the tire low pressure audio warning device available for different applications, various spring tensions would be available by use of different springs 36 within the pressure switch 14.

Typically, a high tension spring 36 would be used to provide low tire pressure warnings around 80 pounds per square inch for truck tires and other high pressure applications. A low tension spring for warning around 20 pounds per square inch would be used for tires on all terrain vehicles and other low pressure applications. There is a wide range of available tensions on spring 36. Thus, available ranges are provided to allow low tire pressure audio warnings for virtually every application.

In another embodiment, not shown, the tension of spring 36 is adjustable. As such, the air pressure which closes the diaphragm 34 is adjustable. This allows a low pressure audio warning device 10 to be adjustable and used for many different applications. The adjustment comes by means of varying the tension on spring 36, in this embodiment. There are several known methods of adjusting the tension on spring 36. Probably the most common type is a screw that moves a plate against one end of spring 36 to reduce or increase the amount of tension. Other methods are also known, but specific methods of providing adjustable pressure switches are not the scope of this invention.

The shell 30 provides a first electrical contact of the low pressure switch 14. A second electrical contact 38 is an electrical conductor electrically connected to spring 36. An insulator 40 insulates the conductor from the shell 30. There is electrical continuity between the second conductor 38, through spring 36 to diaphragm 34. As such, whenever a low pressure condition exists an electrical contact is made between the first conductor, the shell 30, and the second conductor 38, through spring 36 and diaphragm 34. This closes the electrical circuit 22 to allow the audio alarm to be sounded.

Keep in mind that this is only one type of pressure switch available. This type of switch is readily available and is considered the best mode contemplated and the preferred embodiment, only because of its simplicity and availability. However, other types of pressure switches 14 could also be used without departing from the scope and limitations of this invention.

The audio alarm 18 sounds an audio warning when there is a tire low pressure condition, as determined by the pressure switch 14. As with the air pressure switch, there are several different buzzers or alarms that are available and that can be used as the audio alarm 18 with the tire low pressure audio warning device 10 of this invention. The primary considerations in determining the correct buzzer or alarm used includes: it's size since it must be contained within the body 12 that's mounted to a rim 6 or valve stem 4; the audio output since the audio warning has to be heard; and power requirements since it is battery operated and the battery only has a limited power life. Typically, the buzzer size will be around 11 mm (millimeters) by 7 mm (millimeters) to fit within the body 12. It will have an operating voltage of 3.0–6.0 volts and an audio output of 70 decibels or more and weigh approximately 1 to 4 grams. Additionally, the buzzer can be intermittent in nature, buzzing at 1 to 3 second intervals, this feature would help extend battery life. Overall, the principal feature is that an alarm is sounded and the alarm can be heard by someone walking past the tire. As such, any buzzer or alarming device fitting the principal feature can be used.

The battery 20 is as variable as the other components. There are several different batteries that could be used. Typically, the battery 20 will be a button type battery around 10 mm×5 mm, with an operating voltage of 3–6 volts. The battery 20 would weigh approximately 1 to 5 grams. The specific application and configuration would be the determining factor in determining exactly which battery that would be used. As indicated above, several different batteries are known that would satisfy these requirements. The principal feature is that energy can be stored in the battery 20 and there is enough power to sound an alarm on buzzer or audio alarm 18 when a low pressure exists in tire 8.

In addition to the basic embodiment described above, the low pressure audio warning device 10 can contain a centrifugal motion sensor or switch 16, and/or a battery test switch 24. The audio alarm can be set with a single tone or designed with two tones. One tone would be used as the warning of a low tire pressure condition. The other tone could possibly be used for a low battery warning. The battery 20 can be either sealed within the body 12 or it can be replaceable. In the replaceable embodiment, there would be a battery cap 26.

The centrifugal or motion sensor 16 opens when the tire 8 is in motion and closes when tire rotation has stopped. This prevents the audio alarm 18 from sounding when the tire 8 is in motion and saves battery life.

In the replaceable battery 20 embodiment, insertion of the battery 20 would activate the unit. In the sealed battery embodiments, provisions would be provided to activate the unit just prior to usage. This feature (not shown) could be provided by an insulating material positioned between any electrical contacts in electrical circuit 22. The insulating material would be such that it could be easily removed by pulling it out prior to use to complete the circuit. In the sealed battery embodiments, once the battery becomes weak, the entire unit is discarded and replaced.

The body 12 can have several variations. The variation and configuration are determined by the particular application and characteristic of the tire low pressure audio warning device. The body 12, depending on the variation, attaches to a tire 8 by attaching to the standard valve stem 4 of an inner tube or tubeless tire, by a specific opening in the rim of a tubeless tire and use of a custom fitting 42, or by replacing the valve stem itself. In another variation, the device 10 can be attached to a common air manifold that joins two or more tires together. These variations are provided such that the device 10 can be used with virtually any pressurized tire. This includes, but is not limited to, tires on passenger cars, trucks, tractor/trailer, busses, commercial vehicles, industrial vehicles, trailers of varies nature, farm equipment, factory equipment, airplanes, motorcycles, bicycles, and any other type of pressurized tire.

The body 12 would typically be made of a hard rubber, molded rubber, molded plastic or a similar material with the components sealed within. It could even be made with some sort of metal if desired, as long as the electrical circuit 22 functions properly and the components do not electrically short out. However, the particular material and configuration can be determined by the manufacture and particular application.

In some instance, especially when used with high tire pressure, the body 12 can also be reinforced with a steel band or other protective sleeve 28. The sleeve 28 would wrap around or slide over the body 12. The sleeve 28 could be molded in place, wrapped around, or slid over the body 12 after the body has been manufactured.

The simplest embodiment considered and the best mode contemplated for the tire low pressure audio warning device 10 of this invention simply screws onto an existing valve stem 4, similar to a valve stem cap. This configuration is probably the most universal since it can be adapted to virtually any tire in existence. The tire low pressure audio warning device 10 can also function as a valve stem extension. Both of these embodiments would have a female threaded opening with standard valve stem threading and sizing. Of course, there would be a seal of some sort between the body 12 and the valve stem 4 to prevent air leakage, such as an o-ring or sealing compound. Since an existing valve stem contains a needle valve, the tire low pressure audio warning device 10 would include a valve depressor 54. The valve depressor 54 would, as the name implies, depress the needle valve in the valve stem 4, so that the pressurized air within the tire can enter an opening in the body 12 and be in air communication with the pressure switch 14 via air passage 32.

Within the body a metallic sleeve or metal valve stem 50 can be provided. The metal valve stem 50 would extend the length of the body 12. The metal valve stem 50 provides additional strength and endurance, especially when used with tires having higher air pressures. The metal valve stem 50, along with body 12, can function as a valve stem extension. In this embodiment, the metal valve stem 50 is female threaded, reference numeral 56, to accept standard male threads on a standard valve stem 4. The outer end would be male threaded, reference numeral 48, to receive a standard valve stem cap. Air passage 32 would be in air communication to the pressurized air within the metal valve stem 50. Since the tire low pressure audio warning device 10 of this invention can function as a valve stem extension, there is an internal needle valve 58. This prevents pressurized air from escaping just as the needle valve functions in the valve stem 4. The air passage 32 would be attached between the seat of the needle valve 58 and the valve depressor 54.

In addition to attaching to a standard valve stem 4, the body 12 can be made to be attached to an opening in a rim 6 of a tubeless tire in place of the valve stem 4 or in a separate opening made for this purpose. The body 12 can be made to attach to the opening directly or through the use of a custom fitting 42. In this arrangement, the tire low pressure audio warning device 10 or custom fitting would be installed prior to mounting the tire on the rim 6.

When used in place of the valve stem and to function as a valve stem, the body 12 would contain a needle valve 50 to prevent the pressurized air from escaping. There would be a male threaded outer end 48 to receive a valve stem cap. Typically, but not necessarily, there would be an internal metal valve stem 50 used. As above, this would provide additional strength and structure within body 12.

Figure 7:
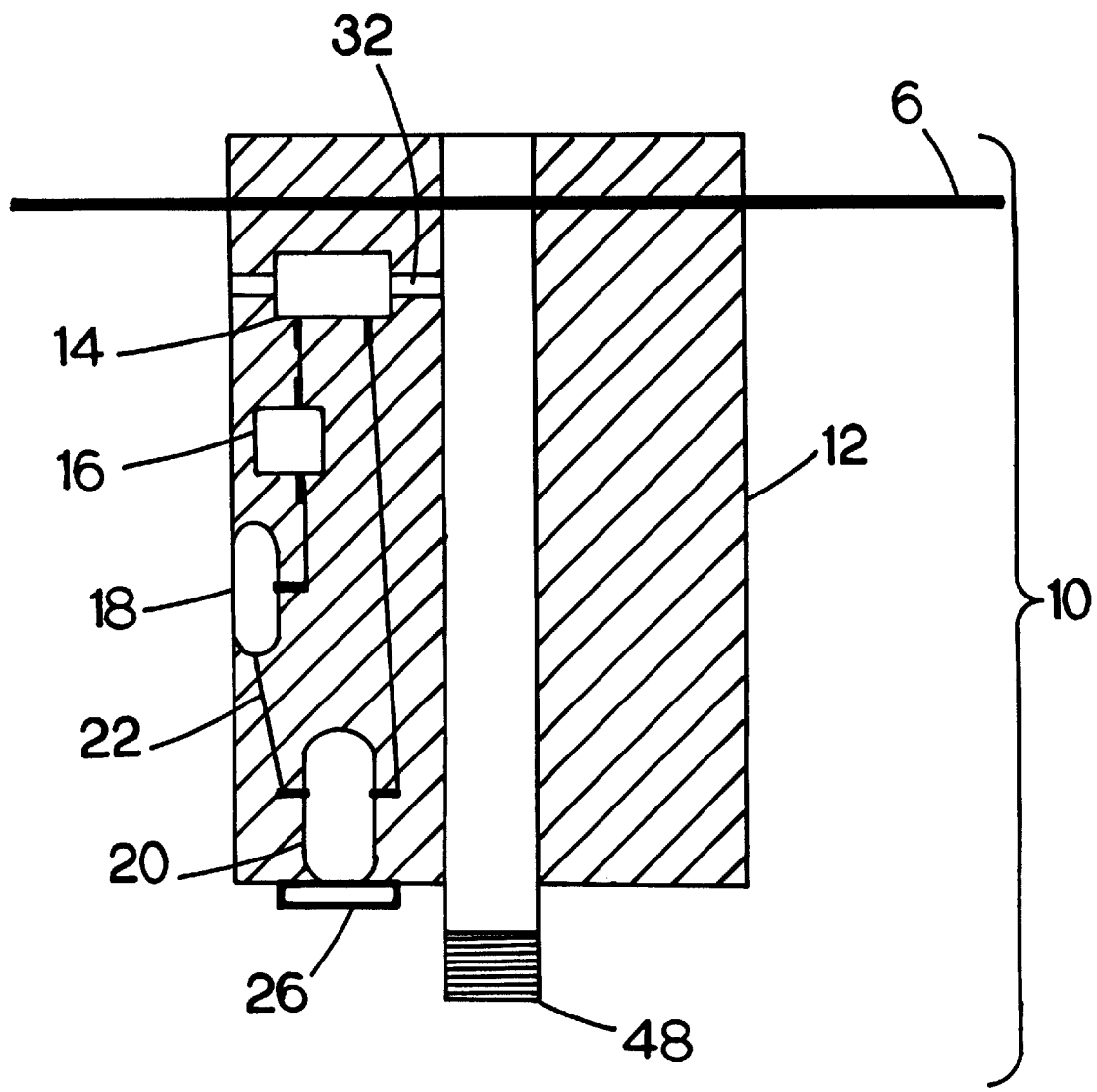
FIG. 7 shows the basic design of the tire low pressure audio warning device used in place of a valve stem and having a centrifugal or motion sensor switch.
Figure 8:
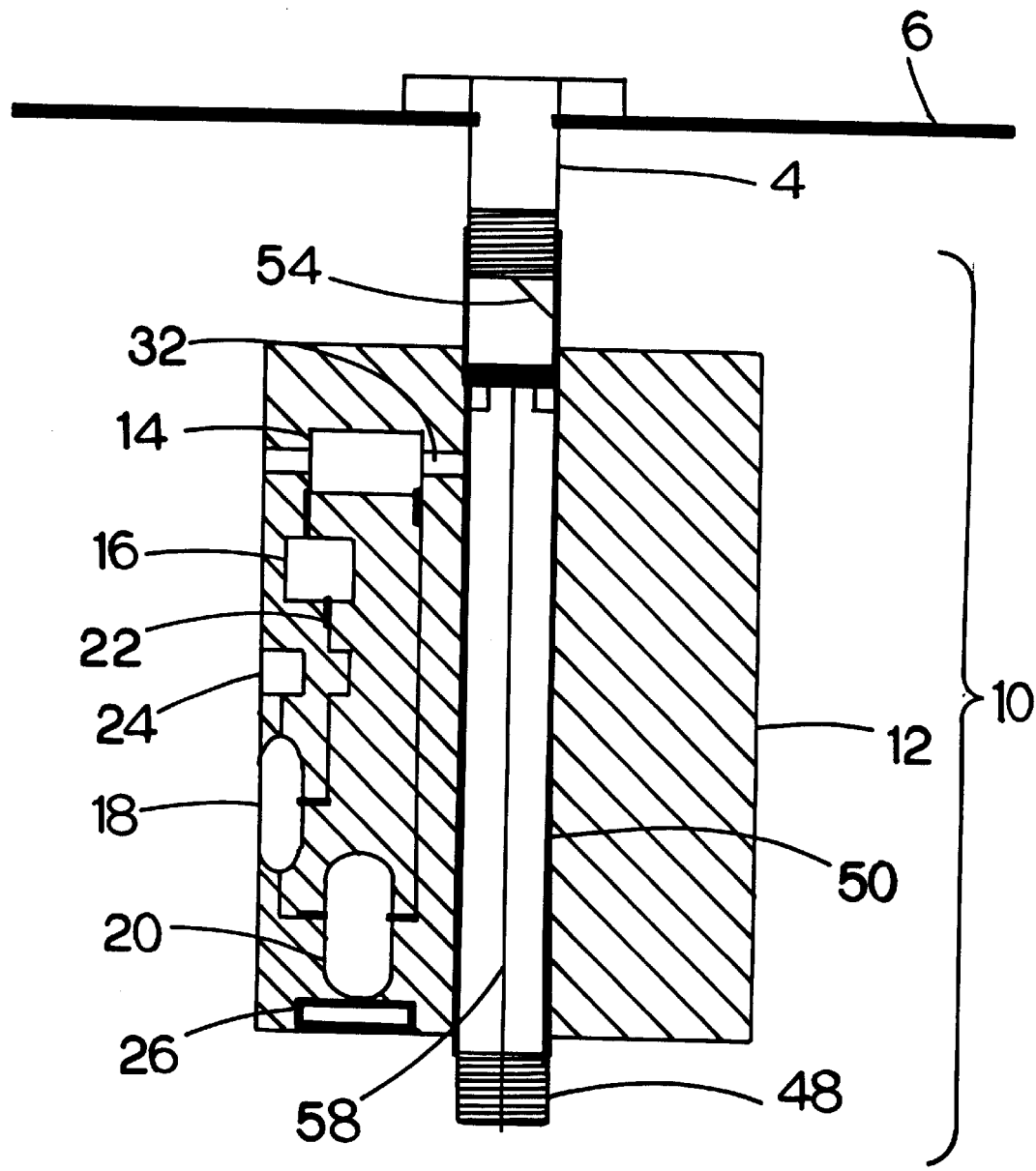
FIG. 8 show another embodiment of the tire low pressure audio warning device, used as a valve extension and having additional features of a centrifugal or motion sensor switch, and a battery test switch.

The body 12, as shown in FIG. 7, can be designed to seal itself in an opening on rim 6. In this embodiment, there is a groove around the body lower perimeter. The body 12 is installed in the opening of rim 6 with the edge of the rim opening seating within the groove, similar to installing a grommet. The body itself and the groove secures and seals the body 12 in the rim 6 and prevents air leakage.

Figure 9:
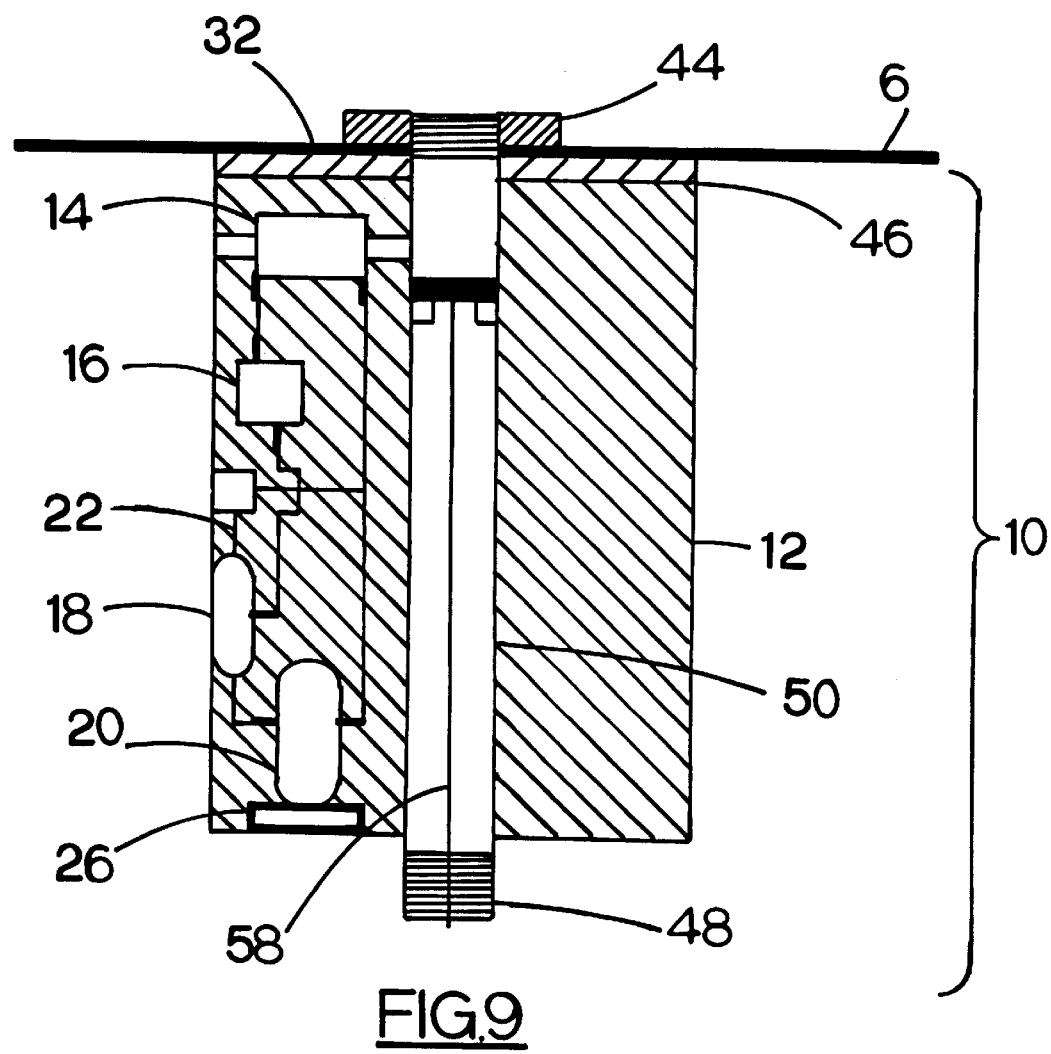
FIG. 9 show a tire low pressure audio warning device used as a valve stem and having additional features of a centrifugal or motion sensors witch, and a battery test switch.
Figure 10:
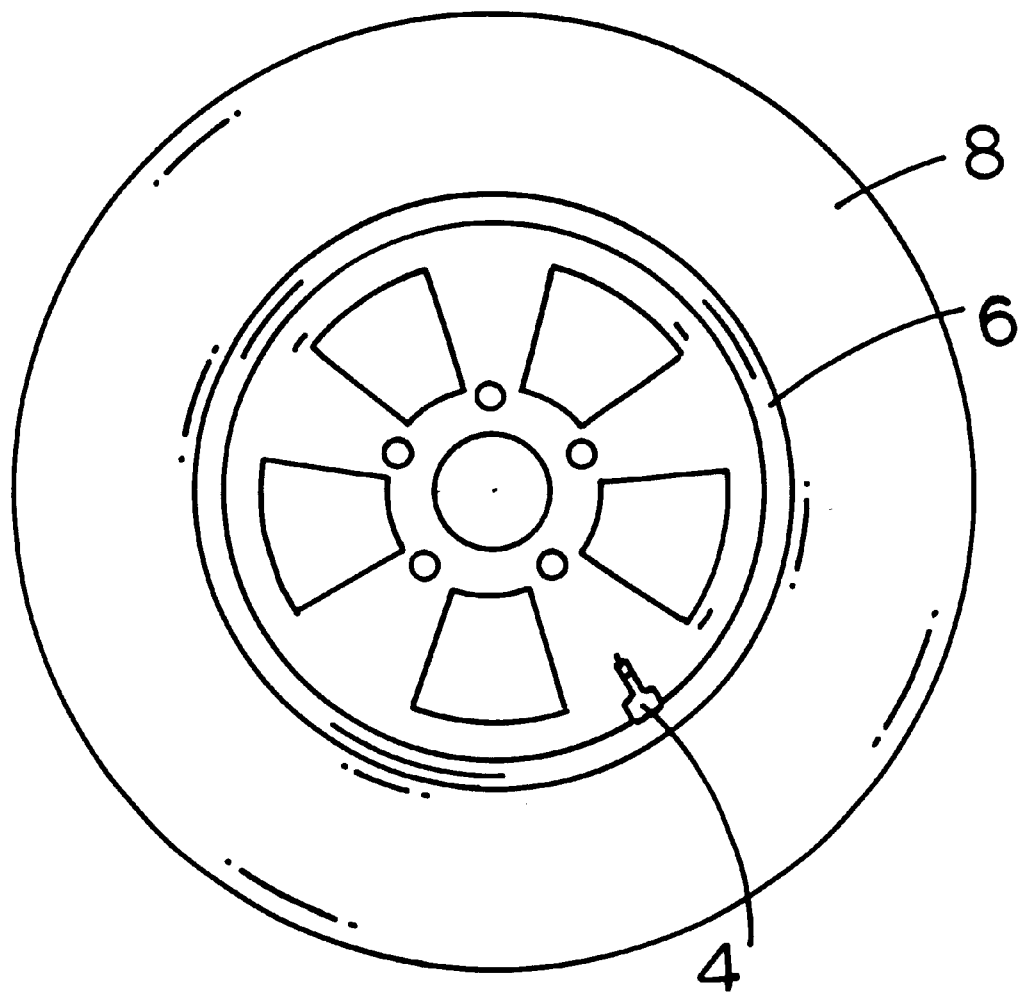
FIG. 10 shows figuratively a tire, rim, and valve stem.
Figure 11:
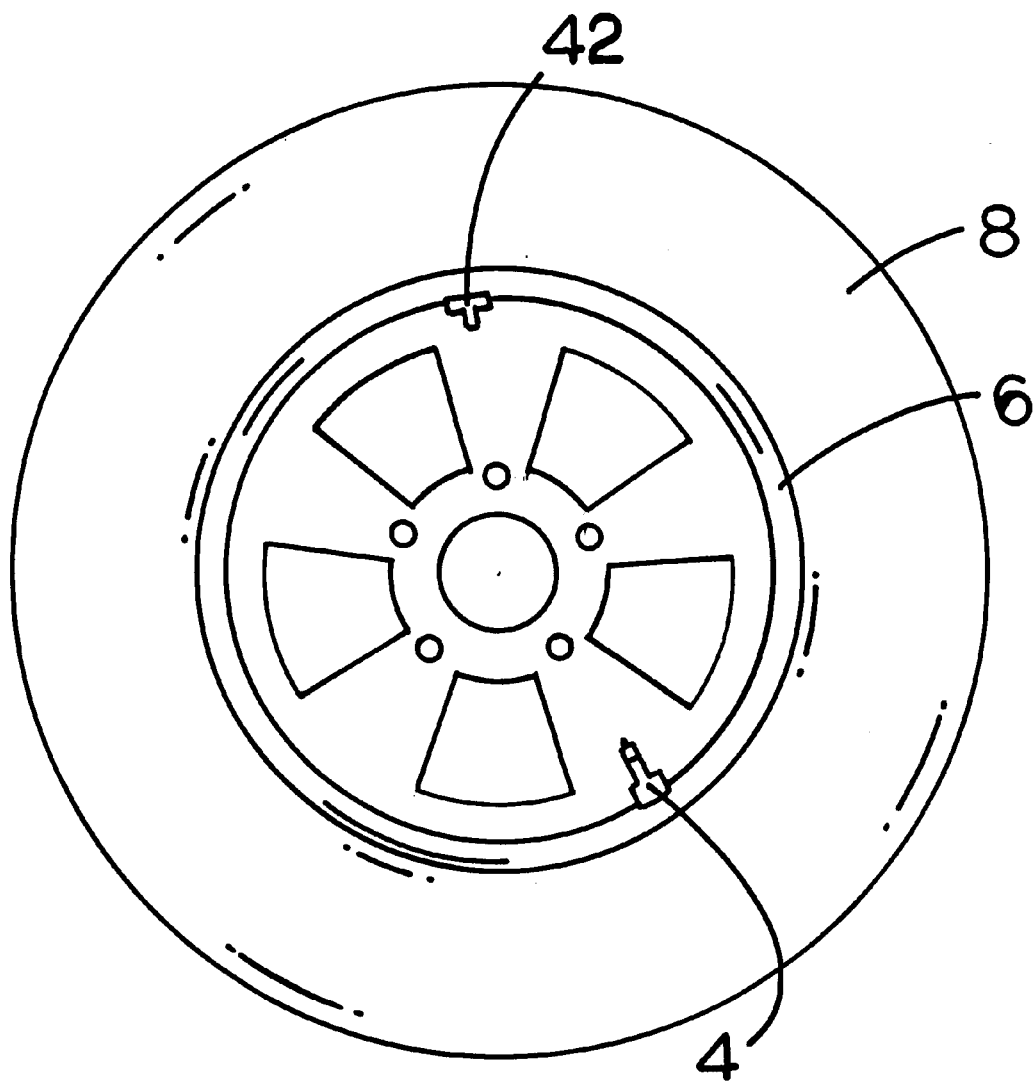
FIG. 11 shows figuratively a tire, rim, and a custom fitting to receive the tire low pressure audio warning device of this invention.

As shown in FIG. 9, in another embodiment, the body 12 is secured and sealed directly to the opening in rim 6 by use of a threaded nut 44. The threaded nut 44 is screwed to a male threaded end of metal valve stem 50. A sealing washer 46 is placed between the body 12 and rim 6 to seal the junction and to prevent air leakage.

Other embodiments use a custom fitting 42. Embodiments using a custom fitting 42 can function as a valve stem, as described above or it can function exclusively as the tire low pressure audio warning device 10 of this invention. The custom fitting typically does not contain a needle valve, as does a valve stem 4. Therefore, a valve depressor 54 is not required. However, if the tire low pressure audio warning device is to be used as a valve stem, a needle valve 58 would be installed within the body 12 and typically within the metal valve stem 50 within body 12.

Figure 3A:
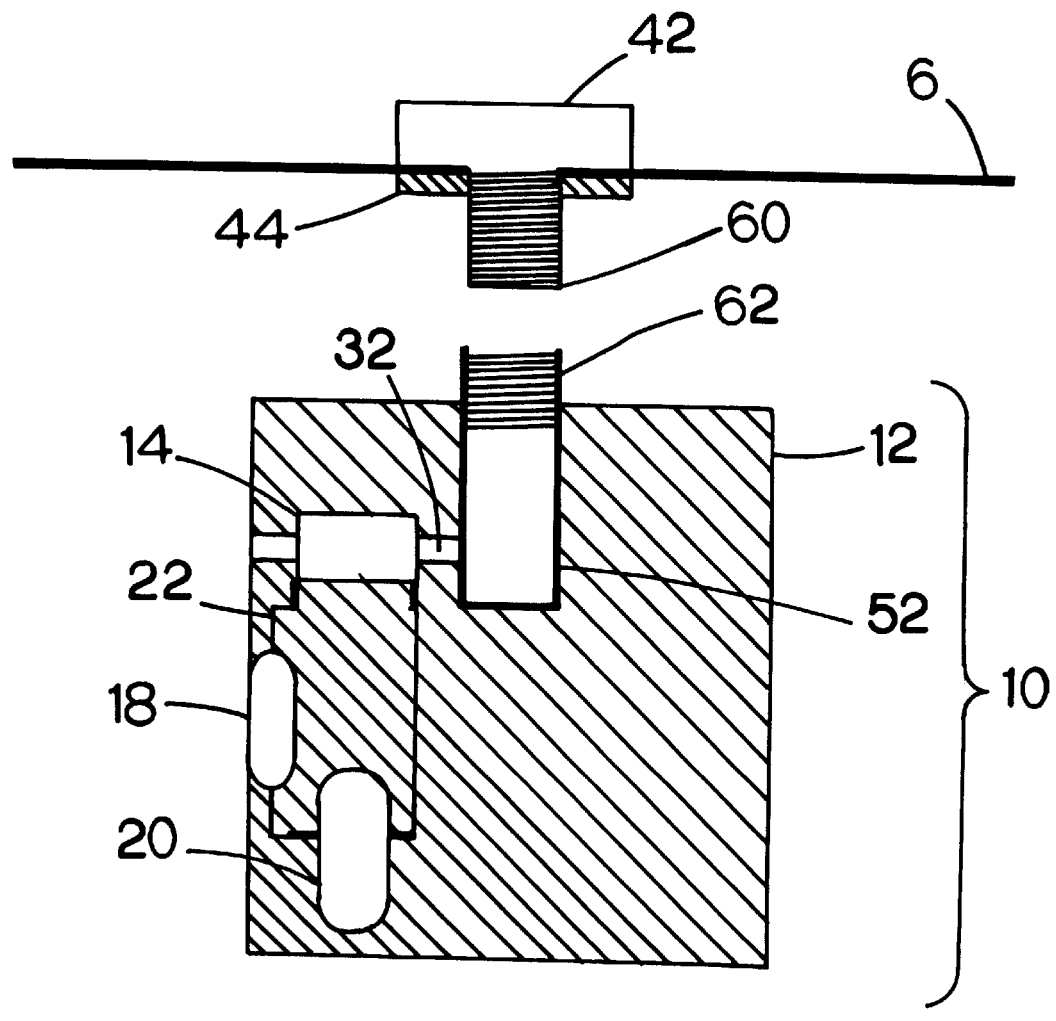
FIG. 3A shows a representation of the tire low pressure audio warning device, having a low pressure switch, audio alarm and a sealed battery in a body attachable to a custom fitting.
Figure 3B:
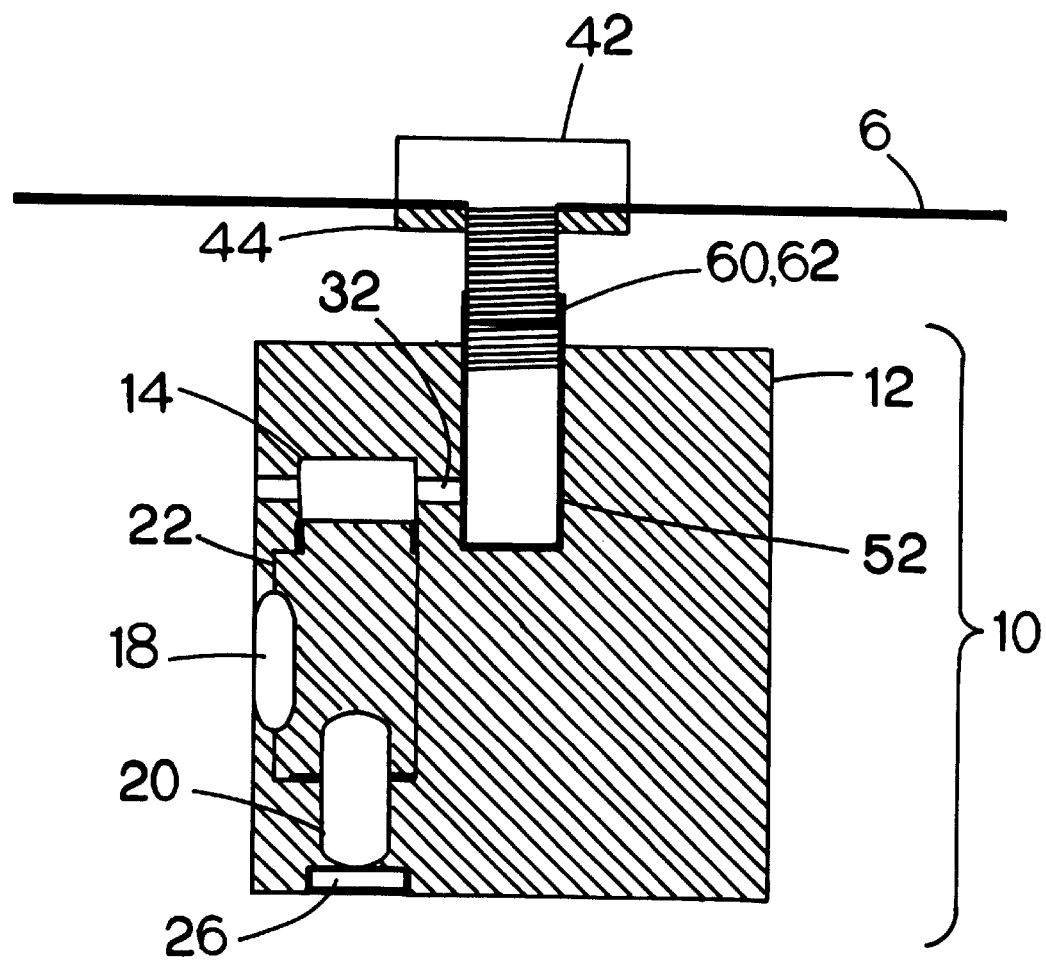
FIG. 3B shows the tire low pressure audio warning device of FIG. 3A but with a replaceable battery, and attached to a custom fitting.
Figure 4A:
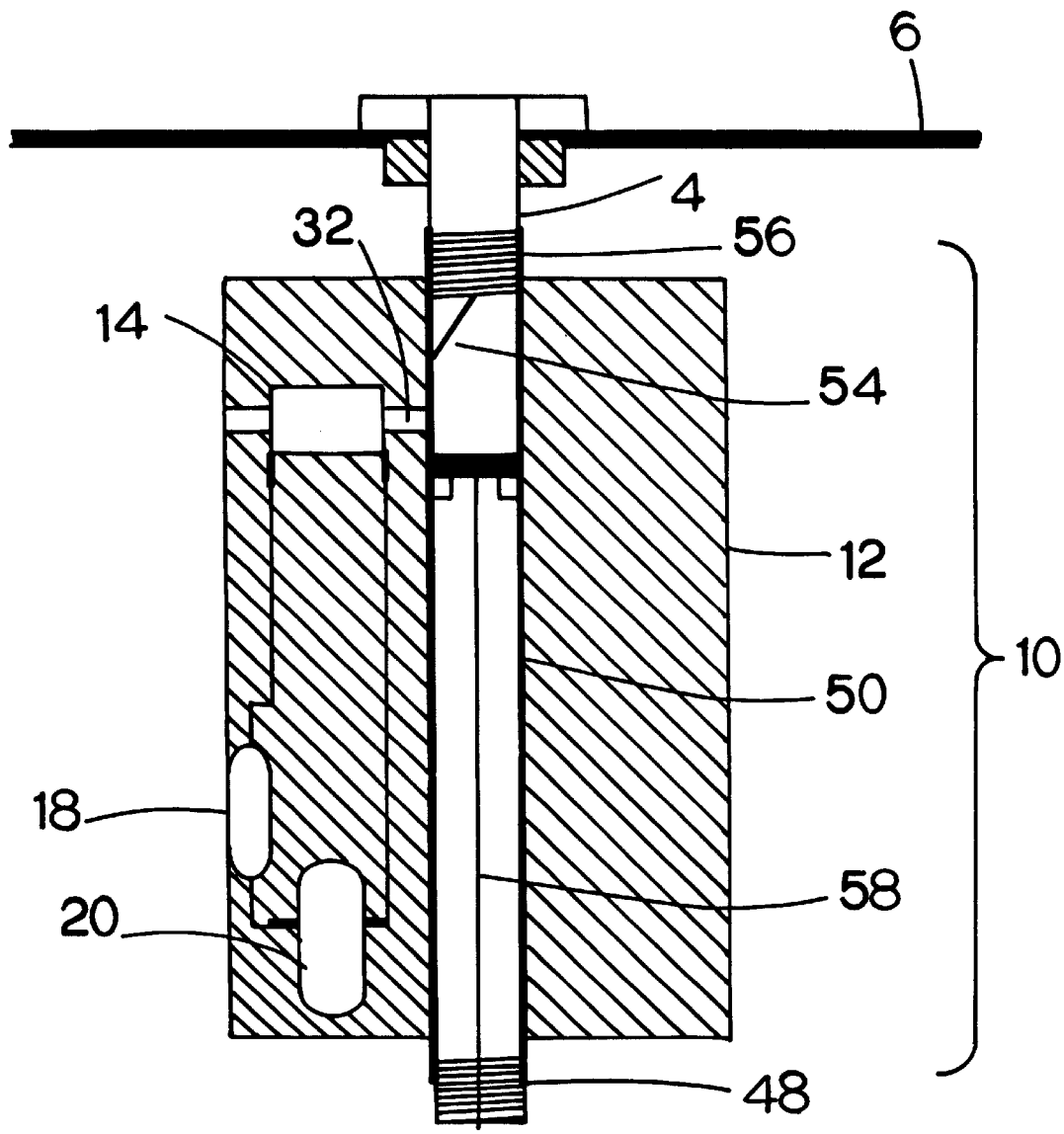
FIG. 4A shows a representation of the tire low pressure audio warning device, having a low pressure switch, audio alarm and a sealed battery in a body that attaches to a standard valve stem and functions as a valve stem extension.
Figure 4B:
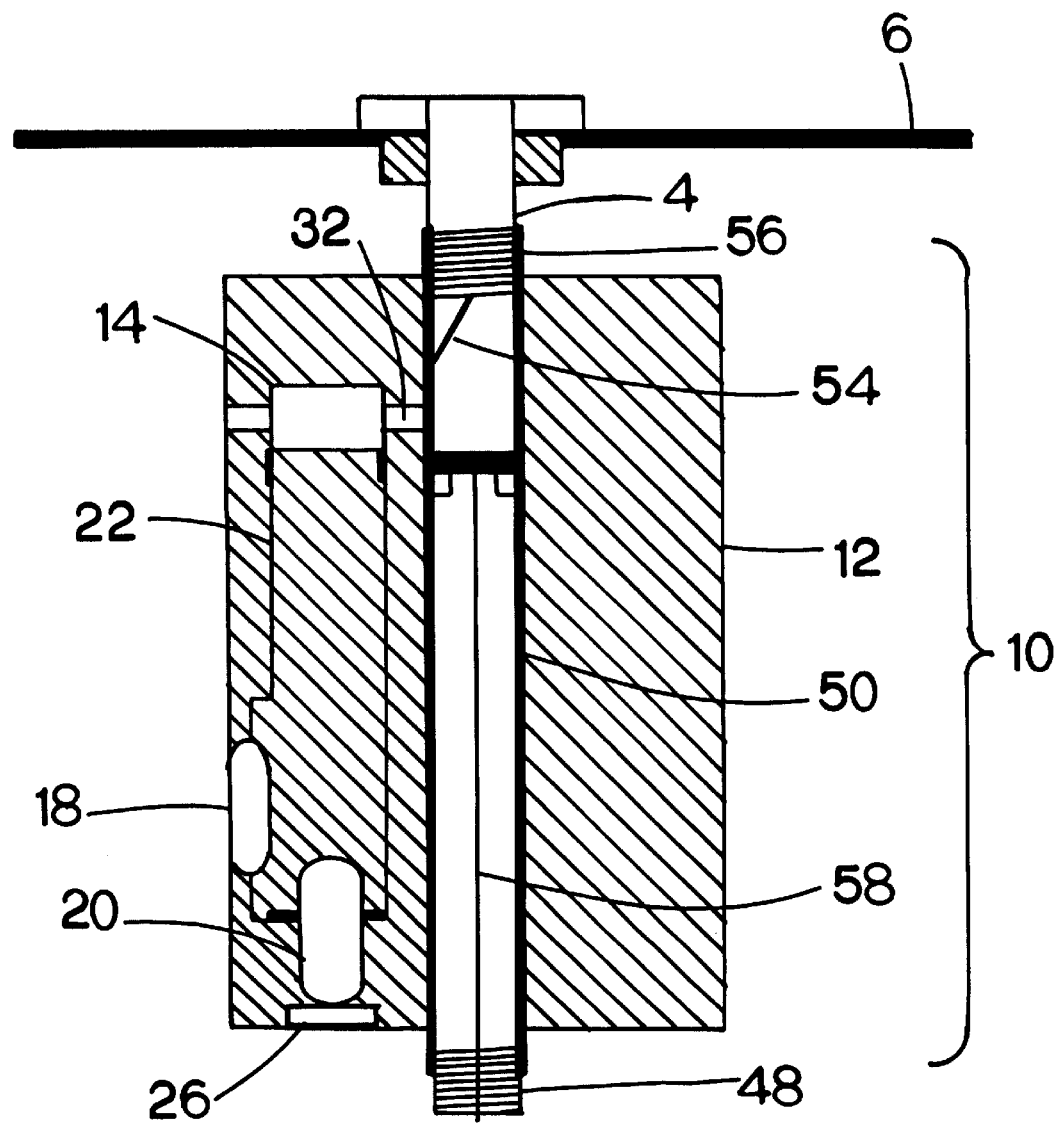
FIG. 4B shows a tire low pressure audio warning device of FIG. 4A but with a removable battery.
Figure 4C:
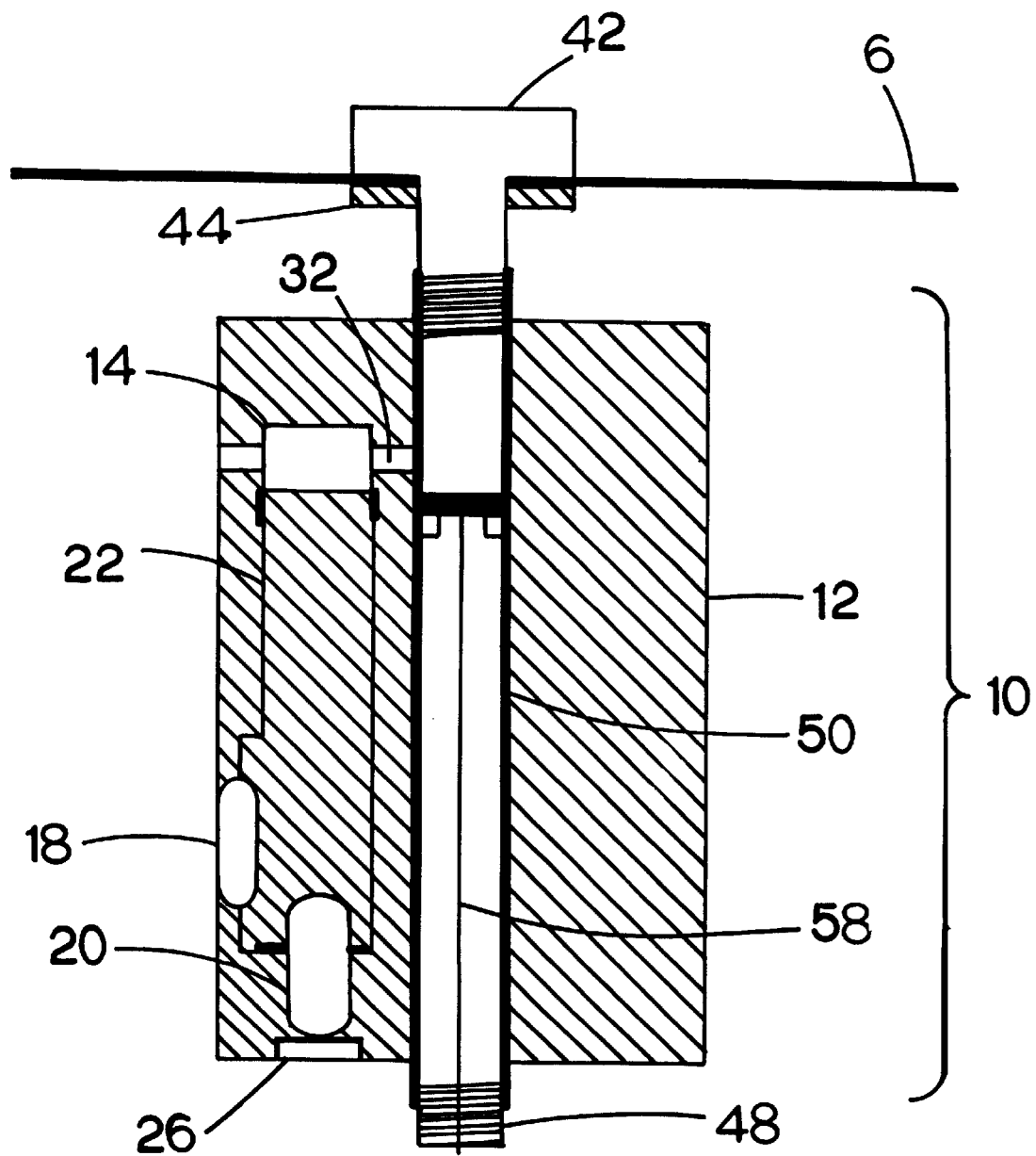
FIG. 4C shows the tire low pressure audio warning device of FIG. 4B but attached to a custom fitting and containing a needle valve.
Figure 5:
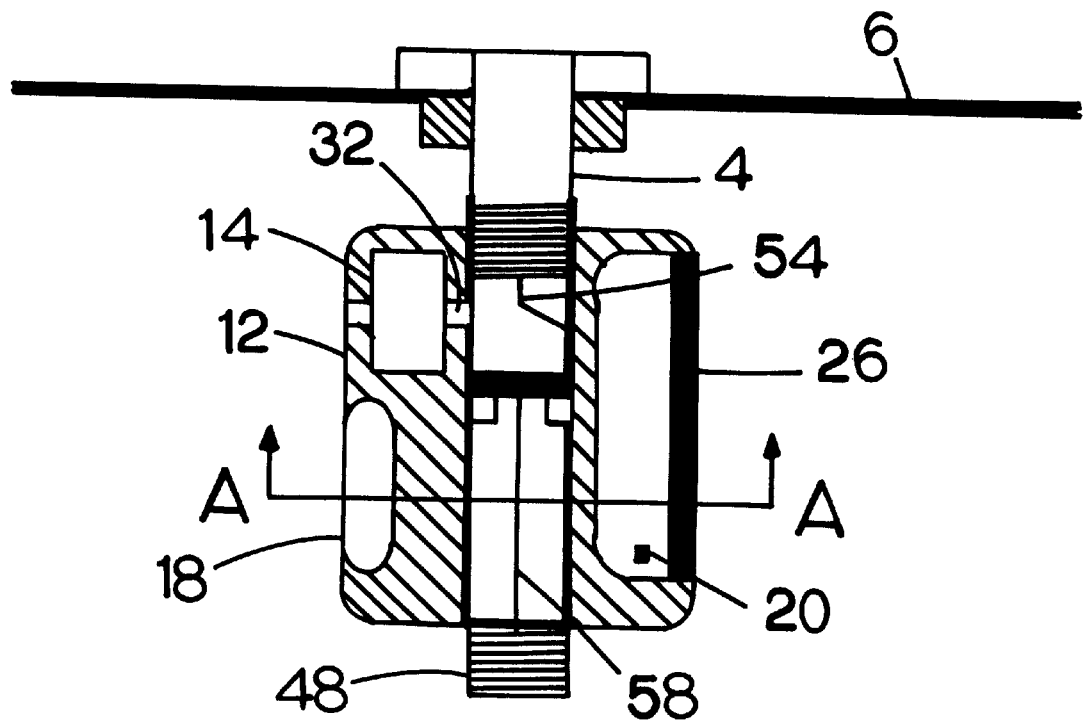
FIG. 5 shows the tire low pressure audio warning device, in another embodiment, as a valve stem extension.
Figure 5A:
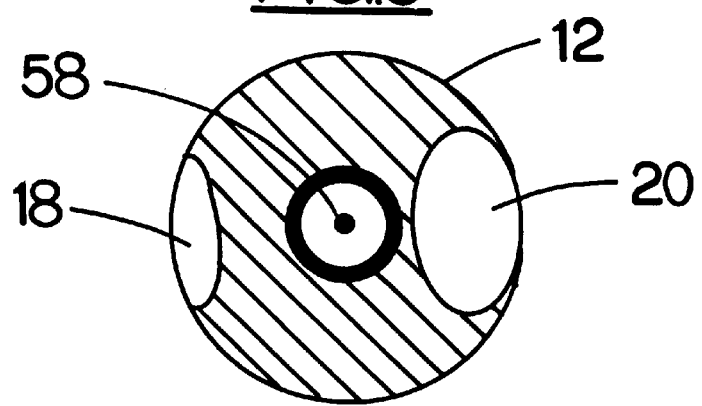
FIG. 5A is a cross sectional view along A—A of FIG. 5.
Figure 6:
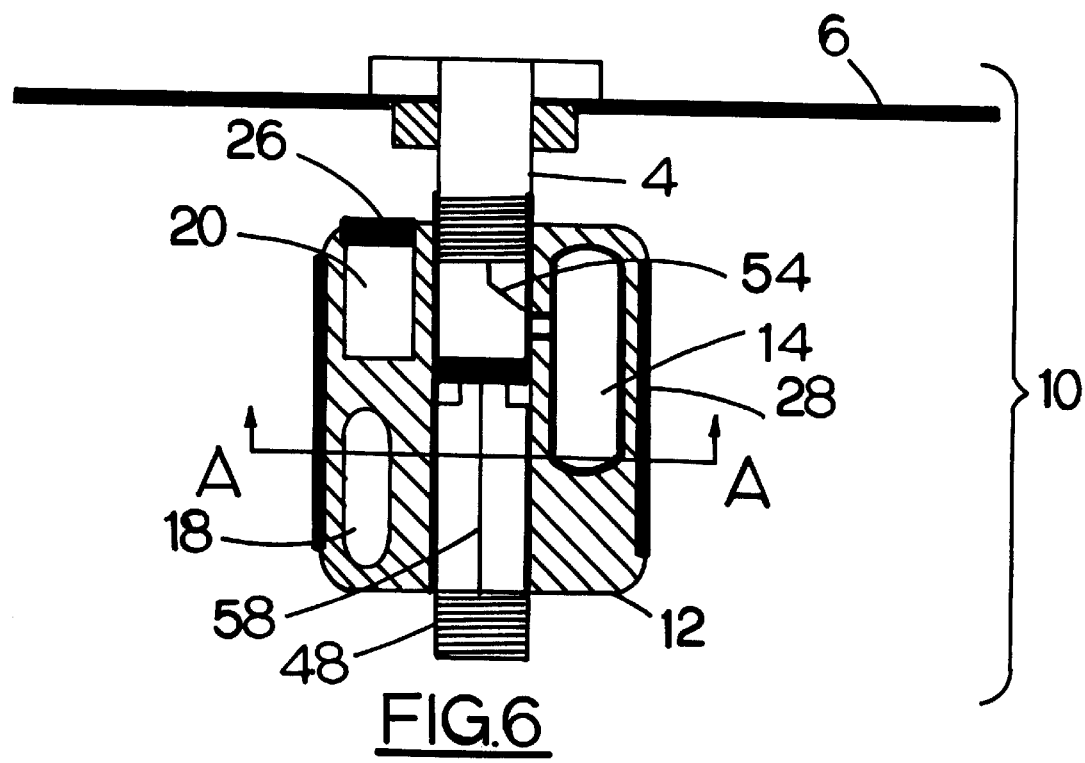
FIG. 6 shows another embodiment of the tire low pressure audio warning device, used as a valve stem extension, having a replaceable battery and an outer sleeve.
Figure 6A:
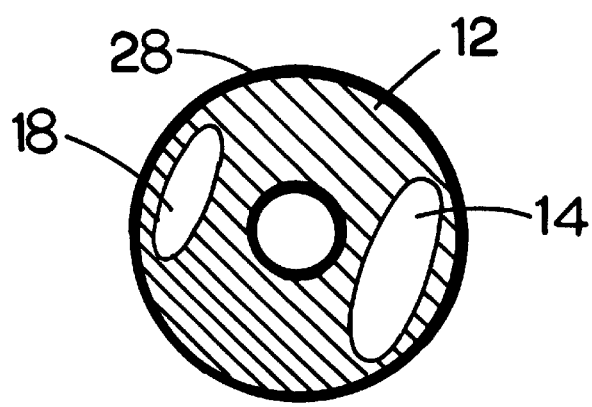
FIG. 6A is a cross sectional view along A—A of FIG. 6.

The custom fitting 42 can be attached using any known method. Typically, and in the preferred embodiment, the custom fitting 42 will be installed by inserting the fitting 42 through the opening in the rim 6 from the inside. A nut 44 would be screwed on the threaded end to secure the custom fitting to the rim 6, as shown in FIGS. 3A, 3B and 4C. A seal of some sort, and preferably a sealing washer, would typically be used to ensure the custom fitting 42 does not leak. Once the custom fitting 42 is installed, the tire low pressure audio warning device 10 is screwed on the threaded outer end 60. A seal is formed between the threaded end 60 and the threaded open end 62 to prevent air leakage.

Figure 3C:
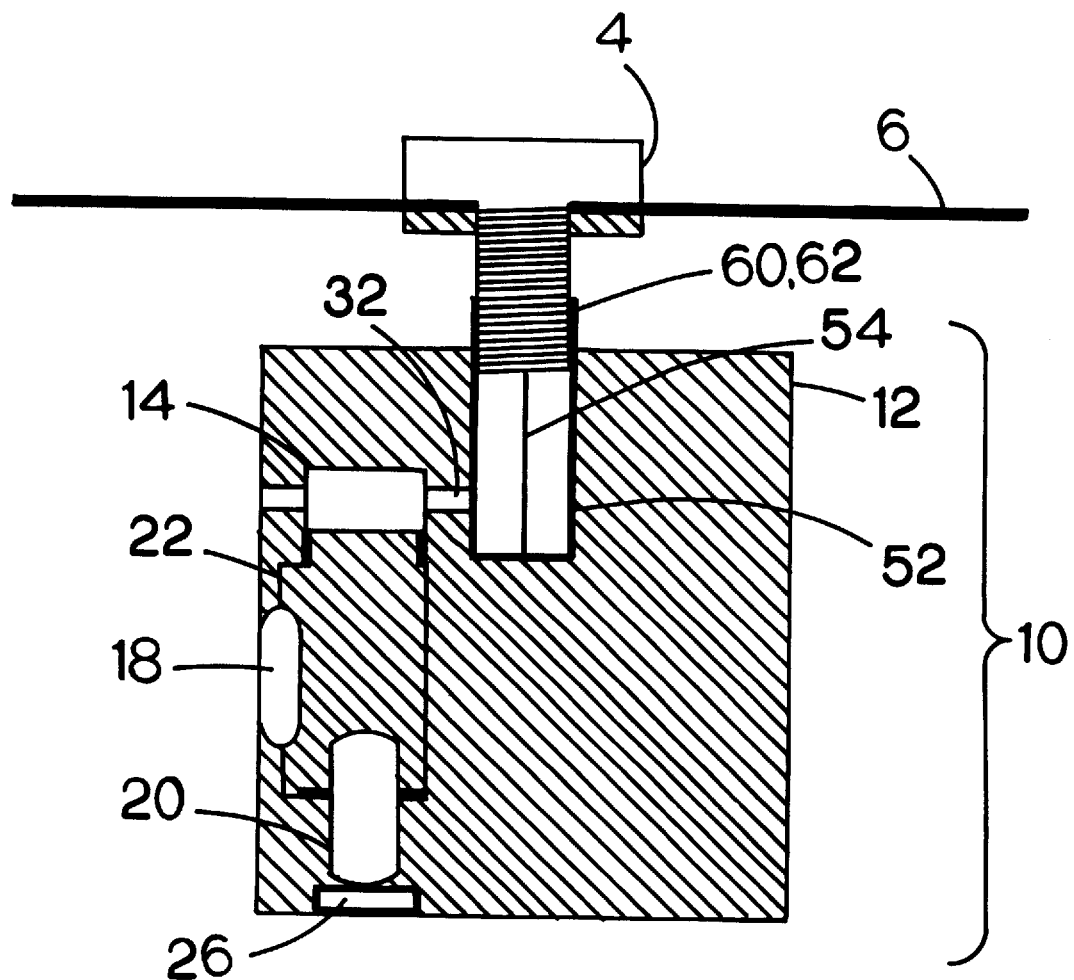
FIG. 3C show the tire low pressure audio warning device attached to a valve stem in place of a valve stem cap.

The tire low pressure audio warning device 10, if not used as a valve stem extension, can contain a cap 52. FIGS. 3A–3C. Cap 52 would have a female threaded opening 62 so that it can be screwed onto the threaded end 60 of a custom fitting 42 or to a valve stem 4. The cap 52 would be enclosed within body 12 and provide air communication with air passage 32. If used with custom fitting 42 there would be no need for a valve depressor, but there would have to be a seal at 60 and 62 to prevent air leakage. If used with a valve stem 4, a valve depressor 54 would have to be used as shown in FIG. 3C. The cap 52 simply provides air passage to the body 12 and provides a means of attachment to the valve stem or custom fitting. The arrangement in FIG. 3C will probably be the most used in that it is simple, convenient and easily attached to existing valve stems 4 in place of a valve stem cap or to a custom fitting 42.

The figures are only representative in nature. They show the basic principal features not the exact configuration. The actual appearance of the body 12 in most instances, will differ. The exact location of the components in the body 12 is not important as long as they function as described.

This invention, as indicated, can be used for a wide variation of applications. The varies applications may require particular materials, arrangement of components, and specific type of components. As long as the basic limitations of this invention are meet, all variations are considered within the scope of this invention as claimed. Since there are a wide variety of uses, it would be impossible to list all the possibilities. As such, any embodiment having the principal features, as claimed and described, will be within the scope and limitations of this patent.

Having described the invention in detail, those skilled in the art will appreciate that modifications may be made of the invention without departing from the spirit of the inventive concept herein described. Therefore, it is not intended that the scope of the invention be limited to the specific and preferred embodiments illustrated and described. Rather, it is intended that the scope of the invention be determined by the appended claims and equivalents.

What is claimed is:

1. A tire low pressure audio warning device comprising:
    a body attachable to a valve stem or an opening in a rim of a tire, or to a valve stem on an inner tube contained therein, said body being in air communications with pressurized air within said tire;
    a low pressure monitoring device contained within said body to monitor air pressure within said tire, said low pressure monitoring device being in air communication with pressurized air coming from said tire, said low pressure monitoring device having electrical contacts that close when a predetermined low pressure condition exists within said tire and remains opens when air pressure remains above said predetermined low pressure;
    an audio alarm contained within said body and electrically connected to one of said electrical contacts in said low pressure monitoring device, said audio alarm activated by said low pressure monitoring device when said electrical contacts close; and
    a battery contained within said body to provide electric power for said audio alarm, with an electric circuit to electrically connect said battery to said audio alarm and said low pressure monitoring device as appropriate.

2. The tire low pressure audio warning device as set forth in claim 1 further comprising a centrifugal switch contained within said body which is electrically open when a tire is in motion or rotating, and electrically closed when tire rotation is stopped, said centrifugal switch preventing said audio alarm activation during tire rotation.

3. The tire low pressure audio warning device as set forth in claim 1 further comprising a battery test switch in said body, said battery test switch electrically connected to said battery and said audio alarm, said audio alarm being sounded when said battery test switch is closed and when said battery has the capacity.

4. The tire low pressure audio warning device as set forth in claim 1 further comprising a custom fitting, said custom fitting for attachment to an opening on a rim on a tubeless tire, said body being attachable to said custom fitting.

5. The tire low pressure audio warning device as set forth in claim 1 further comprising a longitudinal opening through said body, said longitudinal opening having a first end and a second end, said first end of said longitudinal opening attachable to a valve stem on said rim, an opening in said rim, or to a custom fitting attached to an opening in said rim, a valve within said longitudinal opening to prevent pressurized air from exiting said tire through said longitudinal opening, said second end having exterior threads for receiving a valve stem cap, and said low pressure monitoring device monitoring tire pressure in said longitudinal opening between said valve and said first end.

6. The tire low pressure audio warning device as set forth in claim 5 further comprising a valve depressor, said valve depressor being center positioned and projecting downward towards said first end of said longitudinal opening to depress a valve in a valve stem when said body is being attached to said valve stem to establish air communication with pressurized air within said tire.

7. The tire low pressure audio warning device as set forth in claim 1 further comprising a cap contained within said body, said cap being attachable to a valve stem or a custom fitting attached to an opening in a rim on said tire, said cap being in air communication with said pressurizes air within said tire, and said low pressure monitoring device being connected to said cap to establish air communication with said pressurized air within said cap and said tire.

8. The tire low pressure audio warning device as set forth in claim 7 further comprising a valve depressor, said valve depressor being center positioned in an opening on said cap, said valve depressor depressing a valve in a valve stem when said cap is attached to said valve stem via said opening to allow air communications with pressurized air within said tire.

9. The tire low pressure audio warning device as set forth in claim 1 further comprising a battery cap, said battery cap being removably attached to said body to allow access to said battery so said battery can be changed when battery power is low or expended.

10. The tire low pressure audio alarm as set forth in claim 1 further comprising a reinforcing band or sleeve around said body, said reinforcing band or sleeve providing extra strength and stability for said body.

11. The tire low pressure audio warning device as set forth in claim 1 further comprising a cap within said body, said cap being attachable to a valve stem or a custom fitting attached to an opening in a rim on said tire, said cap being in air communication with said pressurizes air within said tire, and said low pressure monitoring device being connected to said cap to establish air communication with said pressurized air within said cap and said tire.

12. A tire low pressure audio warning device comprising:
    a body attachable to a tire, a valve stem, or a rim of a tire said body being in air communications with pressurized air within said tire or an inner tube within said tire;
    a pressure monitoring device contained within said body to monitor air pressure within said tire;
    electrical contacts contained within said body and operated by said low pressure monitoring device, said electrical contacts being closed when a low pressure condition exists within said tire and remaining open when normal air pressure is within said tire;
    an audio alarm contained within said body and electrically connected to said electrical contacts, said audio alarm being a buzzer that is activated when said electrical contacts are closed;
    a centrifugal switch contained within said body which is electrically open when a tire is in motion or rotating, and electrically closed when tire rotation is stopped, said centrifugal switch preventing said audio alarm activation when said tire is rotating;

a battery to provide electrical power for said audio alarm; and an electrical circuit to electrically connect said electrical contacts, said audio alarm, said centrifugal switch, and said battery.

13. The tire low pressure audio warning device as set forth in claim 12 further comprising a battery test switch contained within said body, said battery test switch being electrically connected to said battery and said audio alarm, said audio alarm can be activated when said battery test switch is closed and when said battery has sufficient capacity.

14. The tire low pressure audio warning device as set forth in claim 12 further comprising a custom fitting, said custom fitting attached to an opening in said rim for said tire, said body being attachable to said custom fitting to establish air communications with said pressurized air within said tire.

15. The tire low pressure audio warning device as set forth in claim 12 further comprising a longitudinal opening through said body, said longitudinal opening having a first end and a second end, said first end of said longitudinal opening attachable to a valve stem on said rim, an opening in said rim, or to a custom fitting attached to an opening in said rim, a valve within said longitudinal opening to prevent pressurized air from exiting said tire through said longitudinal opening, said second end having exterior threads for receiving a valve stem cap, and said low pressure monitoring device monitoring tire pressure in said longitudinal opening between said valve and said first end.

16. The tire low pressure audio warning device as set forth in claim 12 further comprising a valve depressor, said valve depressor contained within said body where said body attaches to a valve stem, said valve depressor depressing a valve within said valve stem when said body is being attached to said valve stem to establish air communications with said pressurized air within said tire.

17. A tire low pressure audio warning device comprising:

a body attachable to a valve stem or an opening in a rim of a tire, or to a valve stem on an inner tube contained therein, said body being in air communication with pressurized air within said tire;

a battery contained within said body;

a pressure monitoring switch contained within said body and in air communications with said pressurized air in said tire via said body, said pressure monitoring switch closing when a low tire air pressure condition exists within said tire, said pressure monitoring switch being electrically connected to one side of said battery;

a buzzer contained within said body that is activated when said pressure monitoring device electrically closes, said buzzer creating an audio alarm when activated, said buzzer being electrically connected to said battery and said pressure monitoring switch in a series connection to complete an electrical circuit.

* * * * *